United States Patent
Knuuttila et al.

(10) Patent No.: US 7,142,977 B2
(45) Date of Patent: Nov. 28, 2006

(54) METHOD AND SYSTEM FOR COLLECTING TRAFFIC DATA

(75) Inventors: Olli Knuuttila, Kauniainen (FI); Juha Nykopp, Tampere (FI)

(73) Assignee: Elisa Oyj, Helsinki (FI)

( * ) Notice: Subject to any disclaimer, the term of this patent is extended or adjusted under 35 U.S.C. 154(b) by 114 days.

(21) Appl. No.: 10/838,915

(22) Filed: May 4, 2004

(65) Prior Publication Data

US 2004/0243298 A1 Dec. 2, 2004

Related U.S. Application Data

(63) Continuation of application No. PCT/FI02/00837, filed on Oct. 29, 2002.

(30) Foreign Application Priority Data

Nov. 5, 2001 (FI) .................................. 20012139

(51) Int. Cl.
 *G06F 19/00* (2006.01)
(52) U.S. Cl. .................... 701/117; 701/208; 340/995.13
(58) Field of Classification Search .................... 701/1, 701/117, 118, 119, 208, 212, 213; 340/901, 340/902, 910, 917, 988, 991, 995.13; 455/456.1
See application file for complete search history.

(56) References Cited

U.S. PATENT DOCUMENTS

| | | | |
|---|---|---|---|
| 5,465,289 A | 11/1995 | Kennedy, Jr. | |
| 5,933,100 A | 8/1999 | Golding | |
| 6,230,011 B1 | 5/2001 | Guenther et al. | |
| 6,594,577 B1 * | 7/2003 | Nakajima et al. | 701/117 |
| 6,911,918 B1 * | 6/2005 | Chen | 340/995.13 |
| 6,922,629 B1 * | 7/2005 | Yoshikawa et al. | 701/117 |
| 6,947,833 B1 * | 9/2005 | Kita et al. | 701/117 |
| 6,952,643 B1 * | 10/2005 | Matsuoka et al. | 701/117 |

FOREIGN PATENT DOCUMENTS

| | | |
|---|---|---|
| DE | 196 38 798 A1 | 3/1998 |
| EP | 0 763 807 A1 | 3/1997 |
| WO | WO 01/01367 A1 | 1/2001 |
| WO | WO 01/23835 A2 | 4/2001 |
| WO | WO 02/01158 A1 | 1/2002 |
| WO | WO 02/03350 A1 | 1/2002 |
| WO | WO 02/43026 A1 | 5/2002 |

* cited by examiner

OTHER PUBLICATIONS

R. Sankar, et al., "Intelligent Traffic Monitoring System Using Wireless Cellular Communications", 1997 IEEE, pp. 210-214.

*Primary Examiner*—Richard M. Camby
(74) *Attorney, Agent, or Firm*—Houston Eliseeva LLP

(57) ABSTRACT

The invention relates to collecting of traffic data with the aid of a mobile station network. Such areas are determined in the mobile station network, wherein the terminal equipment communicates with the network with the aid of one or more predetermined messages. Based on the message between the network and terminal equipment and relating to a first area a first time by the clock is stored, and based on the message between the network and the same terminal equipment and relating to a second area a second time by the clock is stored. The times by the clock are used in order to obtain traffic data by calculating, for example, the time spent on moving from one area to another. By determining the distance between areas along the road it is possible also to determine the speed of the vehicle. Information may also be collected to form a statistic distribution.

28 Claims, 4 Drawing Sheets

Figure 1:
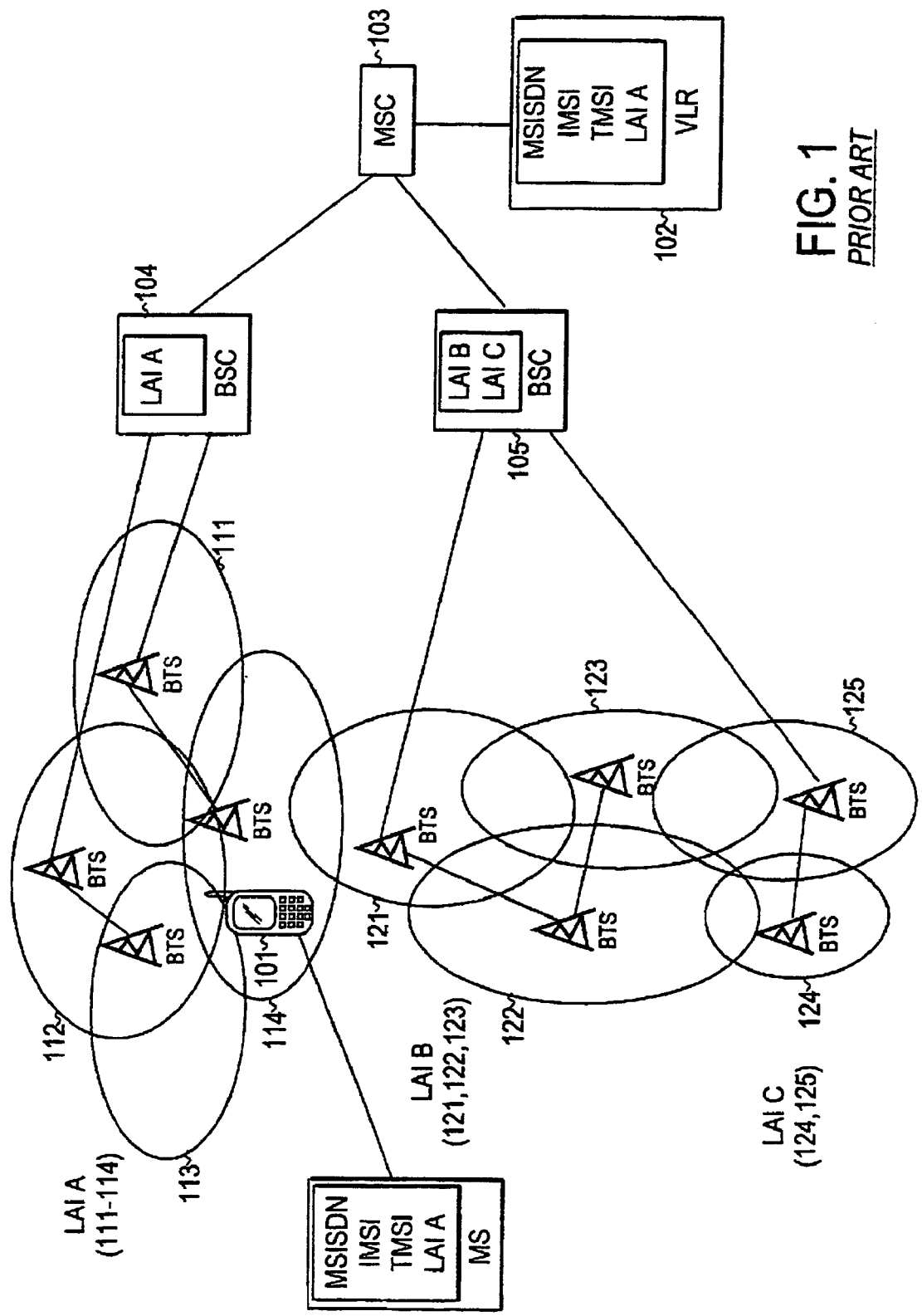

MAIN ROAD 4 (LAI, TMSI, TIME)
(214, A1, 04:45)   (213, A7, 05:25)   (211, A48, 05:54)   ...
(213, A2, 04:53)   (212, A11, 05:26)  (212, A74, 05:58)   ...
(214, A4, 05:00)   (213, A6, 04:34)
   ...                ...                ...

A

RING ROAD I (LAI, TMSI, TIME)
(X13, B1, 05:16)   (X12, B100, 05:40) (X11, B64, 05:54)
(X13, B2, 05:20)   (X12, B57, 05:40)  (X11, B120 05:58)
   ...                ...                ...

B

TMSI TRADING / MAIN ROAD 4
A1 -> (04:45) A7 -> (05:26) A74
A2 -> (04:53) A11 -> (05:25) A48
A6 -> (04:34) A4

C

TMSI TRADING / RING ROAD I
B1 -> (05:16) B57 -> (05:40) B64
B2 -> (05:20) B100 -> (05:40) B120

D

LOCATION AREA INFORMATION / PLACE ON ROAD IN KM
MAIN ROAD 4   DIRECTION NORTH / SOUTH (LAI KM)
214   70    (S1)      213   65    (S1')
213   140   (S2)      212   134   (S2')
212   175   (S3)      211   172   (S3')
 ...

E

LOCATION AREA INFORMATION / PLACE ON ROAD IN KM
RING ROAD 1   DIRECTION EAST / WEST (LAI KM)
X11   10    (S11)     X12   8     (S11')
X12   16    (S12)     X13   15    (S12')
X13   20    (S13)     X14   18    (S13')

F

FIG. 4

METHOD AND SYSTEM FOR COLLECTING TRAFFIC DATA

RELATED APPLICATIONS

This application is a Continuation of PCT application serial number PCT/FI02/00837 filed on Oct. 29, 2002 which claims priority to FI20012139 filed on Nov. 5, 2001 both of which are incorporated herein by reference in their entirety.

FIELD OF THE INVENTION

The invention relates to collection of traffic data with the aid of a network of mobile stations.

BACKGROUND OF THE INVENTION

It has proved necessary to follow the speeds of means of transport, especially vehicles used in road traffic. A particular need has been evident as regards avoidance of traffic jams and road planning, whereby vehicle-specific data collection performed in real time will allow statistic analysing of the traffic as well as a comparison of performance.

Good methods exist for following spot speeds, for example, the police use radars in their traffic control. Besides these, it is possible to use measuring loops reacting to vehicles driving over them. However, neither radars nor measuring loops are able to individualise the vehicle, and it is not possible to measure e.g. reliable average speeds.

For example, in the Helsinki region picture identification methods have been used in connection with traffic data collection. At a road section a camera is placed to take pictures of passing vehicles. At another place along the road another camera is situated to take corresponding pictures. An analysing system, which may be close to real time at best, identifies the licence plates of the vehicles in the pictures. When both cameras have taken a picture of the same licence plate, it is possible reliably to determine the average speed of the vehicle in the picture. In Holland they have also connected a speeding ticket printout device to the analysing system to print out payment orders to the persons in possession of the speeding motorcars.

When real-time traffic data is desired from the area of a large road network, the picture identification method described above has such drawbacks as big investments, because it is expensive to build and maintain the measuring points. In addition, data transmission connections cost money, and the calculation capacity needed for picture identification is not either free. The method is also exposed to weather conditions, which reduces usability especially in countries where much rain, snow or fog will occur.

It has long been known to use a network of mobile stations to localise the subscriber. Using a network of mobile stations also for collection of traffic information is very well known. In the following, reference is made to two publications, U.S. Pat. No. 5,933,100 and WO 01/23835, as the state of the art.

The U.S. Pat. No. 5,933,100 shows how measurement data of a GPS system is transmitted by a mobile station to a data system, which calculates the average speed on each road section in the road network.

In PCT application publication WO 01/23835 special software is located on the terminal equipment to follow the changing of cells in the network of mobile stations and to report on the changes to the system. In one embodiment, the system computes the location of the mobile station and the speed of the mobile station based on the location of the base transceiver station and on the distance between the terminal equipment and the base transceiver station.

In another embodiment (pages 61–63 of the PCT publication) it is proposed that the location of the mobile station can be collected from the base transceiver stations in flight. The information to be collected may concern e.g. periodic beacon transmissions from the terminal equipment to the network. It is also mentioned in the application publication that the location of the mobile station may travel through the service switching point of the mobile station system, whereby the above-mentioned periodic beacon transmissions may be collected from the traffic in the service switching point.

In view of the equipment belonging to the users of the mobile station system, the solution presented in application publication WO 01/23835 does not seem operable, but it contains fundamental problems. Firstly, the terminal equipment is required to transmit extra messages to the network, which will cause unnecessary loading of the air interface in areas with much traffic. In addition, the unnecessary traffic will add to the power consumption of the terminal equipment. Secondly, the presented solution requires changes to the terminal equipment, e.g. mounting of an additional application, which means that the solution cannot be implemented with the existing mobile stations and that the same implementation will not necessarily function on the terminal equipment of two different manufacturers. Thirdly, collecting messages of the network will not necessarily succeed, if some messages travel in a protected form.

Thus, the known art gives no solution model for a method and system, wherein traffic data is collected by using a mobile station system without changes to be made in ordinary mobile stations or without necessary actions by the user. In addition, one of the most difficult problems of the state of the art relates to protection of the individual. The user's privacy is jeopardised, if his movements are being tracked, even allowing that such tracking is for the public good. If such a system is used for collecting traffic data, wherein the users are identifiable, then consent by the users is required even in the smallest possible case. It would be difficult if a user would not give his consent when such generally applicable methods are worked out, which concern all users of the network.

BRIEF SUMMARY OF THE INVENTION

The objective of the invention is to bring about a solution, by which the problems presented above are eliminated. This is achieved by using the method or system according to the independent claims. From the network such areas are sought, wherein the user's terminal equipment and the network exchange messages relating to the area. The user's time of arrival in the first area is stored in accordance with the signalling used by the network and the terminal equipment. Then the stored time of arrival is compared with the user's time of arrival in another area, which is obtained correspondingly as the result of signalling carried on between the network and the terminal equipment. From this time information the time is obtained, which the terminal equipment has used for travelling between two points.

If several users are moving in the area, the measures described above may be taken e.g. on all pieces of terminal equipment occurring at the place. From the time sets thus stored statistic distributions are obtained, which can be used for determining e.g. the average speed and divergences of the traffic occurring on the connection sector.

Tracking the identity of the subscriber is a problem in the mobile station system. For example, in the GSM system, use of the user's IMSI identity (International Mobile Subscriber Identity) is usually avoided for reasons to do with data security and protection of the individual, whereby the IMSI is replaced by a TMSI identity (Temporary Mobile Subscriber Identity), which will change according to the known criteria, e.g. as the updating area changes. In one embodiment of the invention the changing of TMSI identities is tracked in order to find out the user's arrival in another area. As the TMSI identification is used in the implementation of the invention, it is not necessary to find out the interdependence of IMSI and TMSI from the network's register.

With the aid of the invention it is possible to determine location pairs or even entire grid networks, which are needed in order to obtain traffic data. The location pairs or the grid network may be determined either with the aid of a signal analyser by combining the data available from signal analysing and e.g. localising data of a satellite or mobile telephone network or by analysing radio measurement data relating to the areas to be determined from the signalling traffic of the mobile station network.

For example, areas wherein the location area changes may be areas in mobile station systems. The solution in accordance with the invention may be implemented in practice by following the signalling relating to the changing of the system's location areas. Obviously, the invention is not limited to GSM or UMTS mobile station systems only, but within the scope of the inventive idea defined in the claims the invention may also be applied to other network implementations allowing user movements, for example, to a packet-switched network of the GPRS or WLAN style, where arrival in the area or departure from the area can be noticed e.g. from transmissions relating to the changing of the routing area of the packets.

LIST OF FIGURES

Figures 2A, 2B:
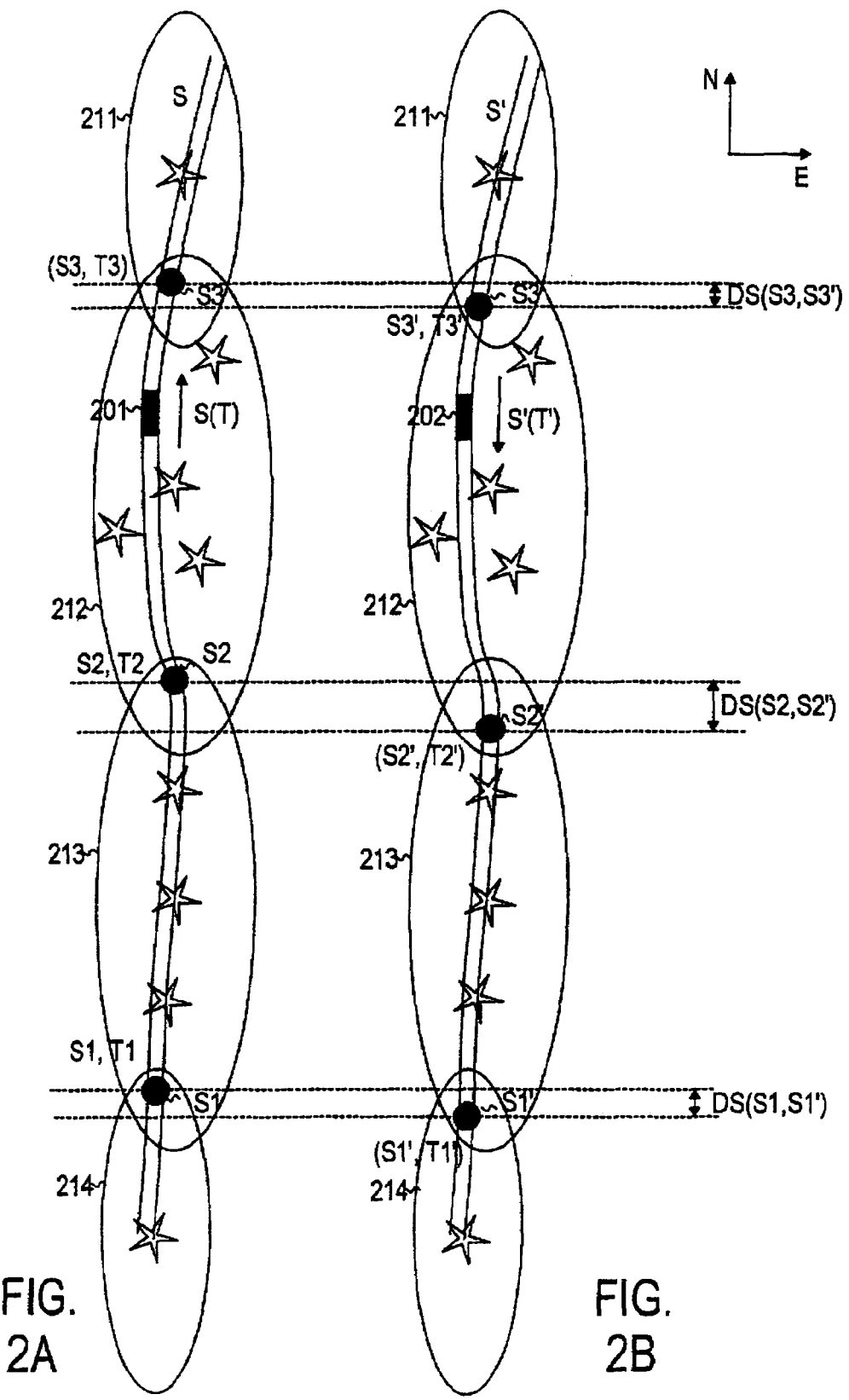
Figure 3:
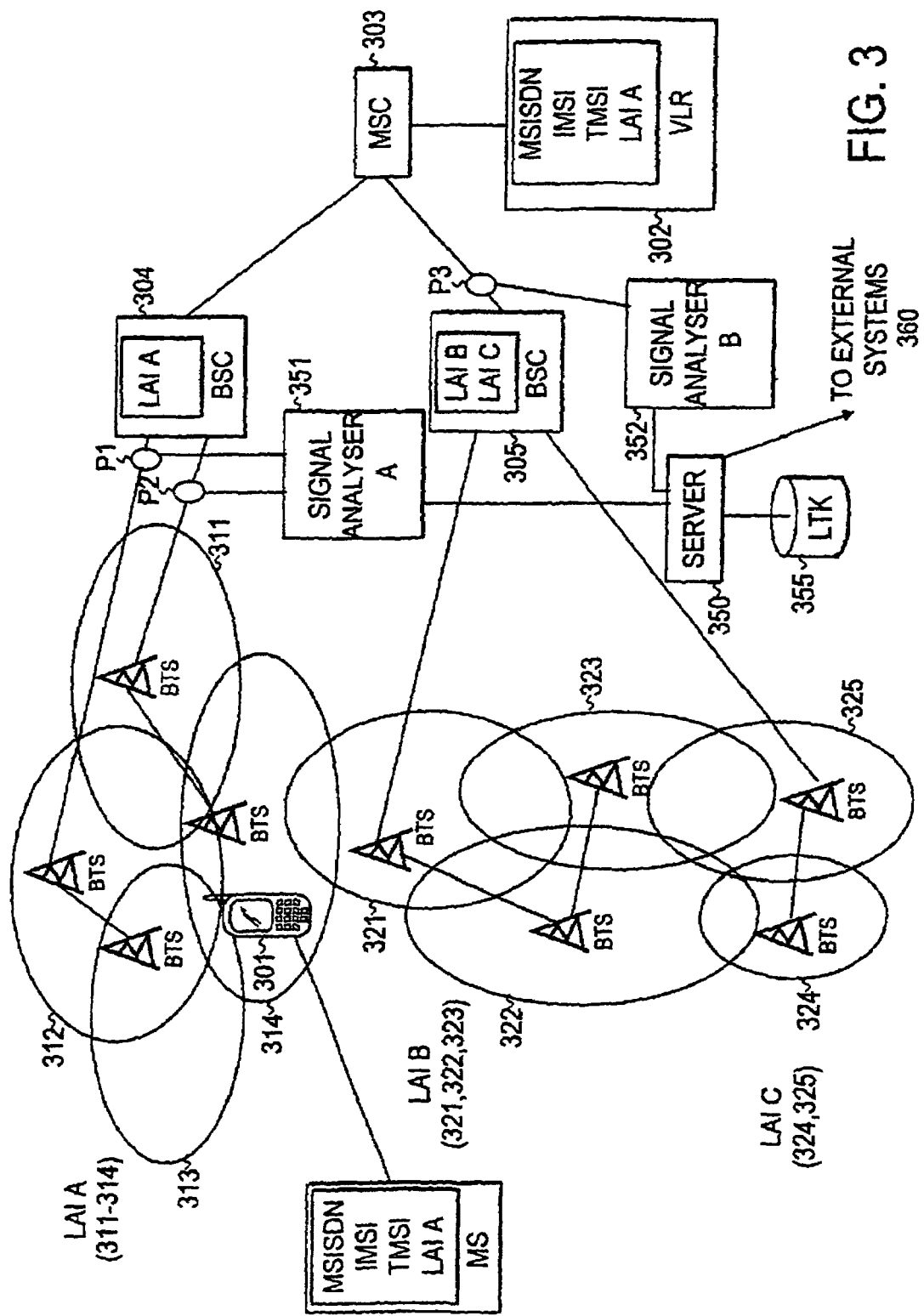

In the following, the principles of the invention will be presented with references by way of example to the enclosed drawings, wherein FIG. 1 presents the operation of a state-of-the-art mobile station system, FIG. 2A illustrates the operation of the method according to the invention in a case where a vehicle is travelling along a road in a first direction, FIG. 2B shows a corresponding situation for a vehicle travelling in a second direction, FIG. 3 is an example of a system used for implementing the invention, and FIG. 4 is an example of the information needed for analysing the road traffic data collected from a mobile station system.

DETAILED DESCRIPTION OF THE INVENTION

Implementation of the invention is successful e.g. in a mobile station system of the kind shown in FIG. 1. In the following, the operating principle of the system will be studied in greater detail as regards the parts with which the invention is concerned.

Mobile station 101 is located in a PLM network, which is a GSM network in the present case. As a general rule, the mobile station is connected to the network through a radio interface, wherein the base transceiver stations (BTS) located in the network form cells (111–125). Each base transceiver station is connected to some base station controller (BSC) 104, 105 located in the network, either directly or by chaining through other base transceiver stations.

The base station controller controls the operation of the radio network and regulates the radio frequencies and time slots used by the mobile stations and base transceiver stations, which are the terminal equipment. The base station controller makes the required decisions based on the measurement results transmitted by the various network elements and terminal equipment. In addition, the base station controller routes further the traffic arriving from base transceiver stations to the mobile switching centre (MSC) 103. A visitor location register (VLR) 102 is arranged in connection with the mobile switching centre. The VLR keeps a record of the users located in the area and of the services ordered for them.

Co-operation between the various parts of the system is needed for routing the call or message arriving for mobile station 101. Originally it has been necessary to search the home location register (HLR) of the subscriber using the mobile station for the identity of the switching centre serving the subscriber. Then, when the call or message has been routed to the appropriate MSC 103, MSC asks VLR 102, in which part of the radio network the subscriber is located. VLR returns the location area identity (LA). Then MSC sends a paging command to BSC 104. BSC commands the relevant base transceiver stations to page the user. To avoid having to search a very large geographical area, for example, the whole country, when paging the subscriber—as the subscriber is usually well localised somewhere—the radio network is divided into location areas. Several location areas may belong to the area of one base station controller.

The mobile telephone follows the broadcast control channel (BCCH) audible in the cell. This channel has information about, among other things, the frequencies and identifiers used by the cell and its adjacent cells, about the frequency hopping order to be used and about paging groups.

The terminal equipment measures the transmission of cells having the strongest audibility, which cells are listed in the BCCH channel of the host cell of that moment. According to the GSM definitions, the terminal equipment decodes, besides the host cell, the six cells having the strongest audibility and from which the BCCH channel is being tracked. When the signal strength of the cell used by the terminal equipment becomes sufficiently weaker than the signal strength of a new cell with better audibility, the terminal equipment will change cell.

The terminal equipment listens to the BCCH channel, for example, with intervals of about 4 s. The cell's identifier is the cell's global identity (CGI), besides which the location area identity (LAI) of the cell is obtained from the BCCH channel. As can be seen in FIG. 1, the location area LAI A is formed by cells 111–114, location area LAI B is formed by cells 121–123 and location area LAI C is formed by cells 124 and 125. When the terminal equipment notices that a new cell has a different LAI than the cells having the best audibility a moment before, it must report on this to VLR, so that the terminal equipment will be available with the methods described above. To this end, in the simplest case 1) MS allocates a channel from the new BTS. 2) MS transmits a Location Update Request to MSC. 3) MSC updates the information to VLR. 4) VLR transmits a Location Update Complete message to the terminal equipment.

If the location areas are located in areas of different VLRs, then the following steps must be taken in addition to those described above: 3') the new VLR seeks user information from the old VLR, 3") the new VLR seeks user information from HLR. Besides this, 3''') MS and the new VLR attend to safety procedures, 5) the new VLR updates the changed VLR information for HLR and 6) HLR cancels the old location either after finding out that the location area has changed or if the old VLR requests it to cancel the location specification.

In order to avoid back-and-forth changing of the location area there is a special hysteresis mechanism for the changing of location area, that is, the location area is not changed immediately upon the change of the location area defined for the area of the cell having the strongest audibility, but there is a wait until the difference in signal strength is big enough. The operator himself can usually determine the cell reselection hysteresis parameter needed between location areas, for example, within a range of 0–14 dB. By way of default value, some equipment suppliers use a value of 6 dB.

In the selection of location area the messages 1), and 2) transmitted by the terminal equipment should in principle be provided with the subscriber's identity (IMSI, International Mobile Subscriber Identity). Likewise, the messages 4) transmitted to the terminal equipment should be addressed to the subscriber using IMSI. As it is possible to listen to the air interface, hostile quarters could track users of the mobile station network unknown to the users. In order to prevent this a pseudo identity is used, a Temporary Mobile Subscriber Identity (TMSI), which to an outside observer appears to be a random number. The relation between TMSI and IMSI is preserved in VLR and in the telephone.

The operator may select the criteria upon the fulfilment of which the TMSI is changed. For example, calls starting out from the terminal equipment or changes of the location area may result in updating of the TMSI. Updating is carried out by an encrypted message, wherein the new TMSI is transmitted in an encrypted language. The terminal equipment receives the message and decrypts the encrypted TMSI using its own encryption key, whereupon the terminal equipment begins using the new TMSI.

Based on the TMSI it is not possible to find out the user's identity (that is, the IMSI), unless there is a possibility to examine the contents of the VLR or of the subscriber identity module located in the terminal equipment.

Some operators do not use the TMSI, whereby IMSI is used in messages passing over the radio interface, which is a risk to data security. In addition, some operators have modified the updating criteria for TMSI in such a way that TMSI is updated more seldom. When the user is on the move, this too is a risk to security. In technical terms, a subscriber identity, which can be tracked, is without significance from the viewpoint of the invention, except that implementation becomes easier when the subscriber identity remains unchanged.

The basic principle of the invention emerges from FIG. 2A. In the figure the imagined places of base transceiver stations are indicated by asterisks. Typically, the location areas of the mobile station network are formed by cells formed by a transmitter/receiver unit located in at least one base transceiver station, and the location area usually includes cells of several base transceiver stations. The subscriber 201 to the mobile station system is moving along a road S as a function of time, being at spot S(T) in location area 212 at the moment T when the picture is taken. When the user has proceeded a sufficient distance into location area 211 to spot S3, so that the location update according to the hysteresis condition is carried out, the terminal equipment will send as a signalling message to the network a Location Update Request message relating to the area. The TMSI reserved for the user at the time is associated with the message, just as was explained above. If the TMSI update conditions are made in such a way that the TMSI will be changed in connection with the location update, then the subscriber already has a different TMSI in location area 211. If the operation of the network is sufficiently without delays, then in close vicinity to spot S3 a Location Update Complete message is also obtained, which is transmitted as a signalling message. However, this is addressed to the new TMSI, since as e.g. the VLR is changed the TMSI will change at the security procedure of item 3'''). The terminal equipment sends a request 2) and receives a message 4) through a cell of the new location area.

If anyone of the above location update messages is picked up from the traffic between the base transceiver station and the VLR, it can be seen that the user, whose identity is TMSI1, is at spot S3 at the time T3. If the TMSI update messages and the corresponding location update messages are also picked up from the traffic between location area 212 and the base transceiver stations and VLR, it can be seen that the identity TMSI2 has been at spot S2 earlier at the time T2. And it could have been seen from messages arrived even earlier from location area 213 that spot S1 had been passed by even at the time T1, whereby the identity TMSI3 was a temporary subscriber identity.

The situation is easier if the TMSI does not change. The system can then be set to track e.g. users arriving in areas S1 and S3. When the same identity is observed first at S1 and then at S3, it is possible to conclude that the user has been moving along the road over the distance S1–S3. The same procedure may be used, if IMSI or a static TMSI is used in the message traffic, but anonymity can then not be said to be quite as complete, but the mobile station is being tracked to some extent.

It has been found out in tests that the location update areas (S1, S2, S3) remain constant with a good accuracy, because in practice the resolution is approximately 100–300 metres. Weather conditions or the location of the telephone in the vehicle have only a minor effect on the location update areas, because the location areas on both sides of the location update area usually suffer from a radio environment of the same type. The resolution is mainly dependent on the gauge length of BCCH channel measurements made by the terminal equipment, which thus is in a class of 4 s.

As is seen from FIG. 2B, when returning in accordance with the hysteresis rule in the second direction along path S' the location update areas are located in a different place, because the required difference of 6 dB in either direction in the case shown as an example means a total difference of 12 dB for the signal strength. When the weather is fine, this is equal to several kilometres. The differences are illustrated by dashed lines between FIGS. 2A and 2B. The dashed lines depict a projection of the difference in distance in road coordinates in the direction of the road. The routes travelled by the vehicles in reality may be quite different compared with the map coordinate points due to the horizontal alignment of the road network and, besides this, the observed signal strengths may change e.g. due to routing effects resulting for them from obstacles in the terrain. For this reason, two separate points should be used, which are obtained by making separate measurements in each direction.

In FIG. 2A, area S1 corresponds to a transfer from location area 214 to location area 213. Correspondingly, area S2 corresponds to a transfer from location area 213 to location area 212 and S3 corresponds to a transfer from location area 212 to location area 211. In FIG. 2B area S1' corresponds to a transfer from location area 213 to location area 214, S2' from area 212 to area 213 and S3' from area 211 to area 212.

The invention may be implemented by building, for example, a system in accordance with FIG. 3 in connection with a mobile station system in accordance with FIG. 1. To the system are added network elements like a signal analyser 351, which tracks the traffic occurring between the base transceiver stations and the base station controllers, in which traffic those messages are also travelling, which are important to the implementation of the present invention. The signal analyser is preferably connected to point P1 to follow the signalling traffic taking place in a 2 Mb E1 cable from a base transceiver station to a base station controller. Several signalling lines to be followed may be connected to the same base station controller (P2 in the shown example). Hereby in the solutions of some suppliers one analyser may follow from eight to sixteen E1 connections, to each one of which 12 transmitter/receiver units, that is, TRX units, can typically be connected in the GSM technology. The signal analyser may be connected to the Internet, and through this it is possible in advance to determine the messages to be tracked by way of a separate connection reserved for control use, if preservation of easy resetting of the equipment's settings is desirable. The messages to be tracked may also be configured permanently in the signal analyser, whereby a change of the duty type will require updating of the software.

Alternatively, the solution may be implemented by also using elements of the signal analyser 352 type, which are connected through points P3 to follow the traffic between the base station controller and the service switching point 303 or the VLR 302. Since data transmission systems use transmission lines with a higher capacity for individual connections, which are at a higher level in the network topology, and since connections at a higher level in the topology also cause larger framing of the signalling traffic, the system will hereby be a little heavier as a whole.

The solution can also be implemented by making the necessary changes in the base transceiver stations, in the base station controllers, in the service switching point or in the VLR. Hereby the address to which information is to be sent about the messages to be tracked is also determined for the element in question, besides the messages to be tracked. However, this alternative requires changes to the existing hardware architecture, which will often cause more costs and longer delivery times. However, implementation of this alternative is possible in connection with the version update of network elements.

When the signal analyser 351 detects a message of the desired type based on the identifier therein, it will send to the address of a predetermined server 350 the time and information contained in the message, besides the predetermined information. The server's address may be, for example, an IP address or some other network address of the server, with which a gate may be associated, to which the message is directed. The signal analyser may also transmit further as such the message it has detected.

As predetermined information there need not be other than the signal analyser's, the base station controller's, some base transceiver station's address or the location area's identity. It is not necessary to transmit the time, because in a non-congested network the time of arrival of the information in the server 350 can also be used as the time of occurrence. Of the information contained in the message at least the mobile station's identity is desired, which depending on the case is either TMSI or IMSI. In addition, in an advantageous embodiment the location area's identity and the message type are also transferred. In an advantageous embodiment the changing of TMSI identities is also tracked, besides the changes of location areas.

The traffic data calculation server 350 receives the update messages of the location area. The update messages may also be processed in their order of arrival by FIFO buffering, whereby new subscribers are added to the tracking, when such a subscriber identity arrives at some measuring point, which has not been detected earlier. Correspondingly, messages relating to identities corresponding to identities, which are already being tracked, may be used directly in order to calculate the time difference and the speed. Based on the update messages information is stored, for example, in a traffic database 355 connected to the server. The traffic database LTK is implemented as a real time database, which may be used with subscriber connections of the CORBA type. The calculation server 350 may be available through the Internet or in ways of connection defined separately. For this purpose, the calculation server is provided with protocols 360 allowing handshaking, which may be e.g. HTTP or FTP. The server may also be timed to transmit the result of analyses periodically, whereby the transmission interval can be set separately for each road section. Hereby the information of road sections with much traffic is updated more often than the information of areas with less traffic. Criteria relating to the quantity of events may also be set as the update interval.

FIG. 4 illustrates information to be stored in the traffic database. The information may be stored on a basis of the road sections maintained by the server. In this manner a larger system can be built, wherein more efficient computer hardware can be used. On the other hand, such a system can be considered as an alternative, where there are only two measuring points, whereby the load on the server and on the database will remain smaller. Hereby one system analyses one road section and supplies the data further, so that it is available to external systems. In the supplied information there may be either distribution or parameters depicting the assumed normal distribution, such as an average value, divergence of the measurement distribution and $\chi^2$, which may be calculated e.g. from the difference between a curve adapted to the material and the measuring points. The value of $\chi^2$ indicates how well the adapted curve suits the measurement results so that values in a range of [0,1] mean that the curve fits within the error limits of the points. In the adapting process some part of the material may be left without consideration, e.g. at the extreme ends such events, which arrive too quickly at the destination (processing error) or too slowly (a departure during the trip or a car crash). In its simplest form the desired traffic data is just the time spent for travelling between two points, e.g. "a trip from Helsinki to Lahti takes 1 h 20 min. on an average"

Database 355 (FIG. 4, A) stores changes in the location area of each subscriber identity, which are detected in the network traffic, on a location area basis over one road section. In addition, the time by the clock relating to the message is also stored. Several road sections (B), from which the corresponding information is stored, may be connected to the database.

If the operator uses TMSI identifiers, a record is kept of these as well (C, D). TMSI identifiers can be detected from the traffic between the base transceiver station and the BSC or correspondingly from the messages on their way to the MSC/VLR.

The road section's kilometre reading (E, F) corresponding to each change of location area is also needed. Kilometre readings may be stored e.g. beginning from the place where the road begins by travelling the route in the measuring direction with a calibrating vehicle and by recording the distance as the location update takes place. Correspondingly, recording of the distance can be made automatic, if the vehicle's place can be stored as a function of time or even simultaneously as a function of time and place, for example, using a GPS locator. It is then sufficient to use the signal analyser to collect the TMSI identifiers of the mobile station connected to the calibrating vehicle, and by comparing the time stamps of messages the location is obtained in the GPS coordinates. Points corresponding to the road network of Finland are obtained with good accuracy from the coordinates by using e.g. a digital map base.

The following is a study of the observation of one means of transport in a case where the vehicle is travelling along main road four from the south to the north. The example is explained with references to FIG. 2A, architectural FIG. 3 and FIG. 4, which presents the contents of the database. The means of transport is moving from location area 214 to location area 213. When the signal analyser 351 of the system tape-records the location update messages transmitted and received in area S1 and transmits them further to traffic data server 350 for storing in database 355 for analysis, the system will know the subscriber's direction, because the signalling time slots on the E1 connection, which are to be tape-recorded, are statically determined. The messages arriving from a certain observation connection of the system (=the PCM time slot to be tracked) indicate directly by their origin in which direction the subscriber has moved in relation to the network. When arriving in the same location update area from opposite directions, the signalling traffic will take place through different cells.

When moving in the example from location area 214 to location area 213 the time by the clock of the observed Location Update Request message was 04:45 a.m. and the subscriber's TMSI was A1. Then the Location Update Complete is observed in the same cell and almost with the same time by the clock, but TMSI A1 has then changed to A7. Changes of the TMSI occurring in the same signalling connection are recorded in their own auxiliary table together with time stamps. When the subscriber arrives in the place of change between the location areas 213 and 212, that is, in area S2, the signal analyser will supply to the traffic data server the time by the clock 05.25 a.m. from the location update request it has observed and the old area's identifier 213 as well as the TMSI A7. Then Location Update Complete is observed in the same cell and almost with the same time by the clock (05:26 a.m. in the example), but TMSI A7 has changed to A74. When A74 of TMSI appears once again in some other part of the network, more information is again obtained about the mobile station's movement and speed. Location Update Complete and Location Update Request with the same TMSI thus form a central part for determining the movement of the mobile station.

In the example, the time by the clock is used in the time calculator, but in a similar manner any such system can be used, which is suitable for measuring the time with sufficient accuracy. Hereby some time stamp will replace the time by the clock.

When the first observation was such a change of the location area, that 213 became the new location area, and the second observation was such a change of the location area that 212 became the new location area, the direction can be concluded, that is, that the change 214→213 corresponds with point S1 and 213→212 corresponds with point S2. Then it can be seen directly from the kilometre section (E) of the database that the distance of area S1 from the beginning of the road is 70 km and the distance of area S2 is 140 km, whereby the distance between the areas S1 and S2 is 70 km. In addition, it is possible to calculate the time spent by the vehicle for the distance, that is, 40 minutes. Obviously, there is no bad traffic jam on the road, as the average speed obtained for the means of transport is 70 km/40 min=105 km/h.

It was proposed in the foregoing that the points of change of area can be found out by doing separate measurements on the road by observing the exchange of messages between the terminal equipment and the base transceiver stations and by measuring e.g. the location of the terminal equipment using GPS localisation. The procedure is suitable for individual road sections, but it involves much work when it is desirable to make a grid network covering a large road network. The grid required for collecting road traffic data may also be collected e.g. by a signal analyser from the traffic of a SDCCH channel (Standalone Dedicated Control Channel) by catching measurement results transmitted by the mobile station to the base station controller. The terminal equipment transmits the results of signal strength measurements of the cell selected in connection with the location update request and of the six adjacent cells having the strongest audibility, using which it is possible to find out the place of the mobile station with sufficient accuracy for collecting road traffic data by using, for example, the methods described in the U.S. patent publication U.S. Pat. No. 6,052,598. The following steps are e.g. correlating the measurement results with the digital road map base, taking from it a kilometre reading corresponding with the concerned place on the road and storing the location area identities and the kilometre reading in the database. In this manner it is possible to collect grid points even of a large road network in an automated manner by collecting measurement results during a sufficient period of time, in order to obtain adequate statistics. By repeating the measurement from time to time the grid network is updated, whereby when the location of base transceiver stations is changed it is possible to eliminate the statistical error effect caused by moving location areas. Analysing of the signalling traffic may be done for terminal equipment moving along the road in both directions in a manner corresponding to analysing done separately along the road, that is, by utilising information from the old location area, whereby specific points corresponding to the place on the road are obtained for the traffic moving in each direction.

In the foregoing, the invention was described applied to a GSM mobile station network for illustrative purposes, but the intention is not to have this interpreted as any limitation of the invention. For example, it is not necessary to use location areas located one after the other, if you want to find out the time spent for travelling a distance, but it will suffice to track one IMSI/TMSI or to keep a record of TMSI changes during a time between at least two crossings of location area borders, which may even be located far from one another. Likewise, the invention may be applied in accordance with the independent claims to various cellular networks and to other wireless networks, from which a useable mechanism can be found for observing messages dependent on the areas. For example, for tracking terminal equipment in a GPRS network it is possible to utilise the change information of the routing area. The invention is also directly applicable to UMTS systems and to WLAN systems of various types, not to mention other applicable networks.

What is claimed is:

1. Method for collecting traffic data with the aid of a mobile station network and terminal equipment in vehicles to be observed, the method comprising:
   defining areas in the mobile station network, wherein the terminal equipment communicates with the network using one or more predetermined messages,
   determining a first time by a first clock with a subscriber identity stored based on a message between the network and the terminal equipment and relating to a first area,
   determining a second time by a second clock with a subscriber identity stored based on a message between the network and the same terminal equipment and relating to a second area, and
   using the first time and the second time to obtain traffic data about the vehicle moving the terminal equipment by
   selecting clock pairs based on the subscriber identity/subscriber identities, calculating differences of the selected time by the clock pairs,
   the calculated differences are collected to form a statistic distribution, and
   a characteristic magnitude is calculated for the statistic distribution.

2. Method according to claim 1, characterized in that the areas are boundary areas in between the location areas of the mobile station network.

3. Method according to claim 1, characterized in that the areas are boundary areas in between the routing areas of a packet radio system.

4. Method according to claim 1, characterized in that the messages between the terminal equipment and the network are location updating requests and/or location updating accept messages.

5. Method according to claim 1, characterized in that a value of the subscriber identity is stored when the subscriber identity changes, and the stored value of the subscriber identity is used when seeking the time by the clock.

6. Method according to claim 1, characterized in that the distance between the first area and the second area is determined using the location information of the areas.

7. Method according to claim 1, characterized in that the average speed of the traffic flow is calculated with the aid of the measurement and the calculated characteristic magnitude.

8. Method according to claim 7, characterized in that a second characteristic magnitude is calculated for the statistic distribution, and a confidence limit of the traffic flow's average speed and/or an error estimate is calculated with the aid of the measurement and the second magnitude.

9. Method according to claim 1, characterized in that the location information of the defined areas is used in order to obtain the desired traffic data.

10. Method according to claim 1, characterized in that to determine the area use is made of measuring equipment arranged in connection with a vehicle and tracking the location areas and/or analyzing the signaling and in combination with satellite radio determination.

11. Method according to claim 1, characterized in that calculatory determination of the location of the area is performed by utilizing the measurement results obtained from the signaling information of the mobile station network.

12. Method according to claim 1, characterized in that a place on at least one of the roads in each area is chosen and the place is stored in the traffic data collection system.

13. Method according to claim 12, characterized in that the said place on the road is chosen based on the reading of a recorder of the covered distance arranged in connection with the vehicle.

14. Method according to claim 12, characterized in that the said place on the road is chosen based on the location information and a digital map base.

15. System for collecting traffic data with the aid of a mobile station network when conventional terminal equipment is located in vehicles to be observed, characterized in that the system includes
   means for determination of such areas, wherein the terminal equipment communicates with the network with the aid of one or more predetermined messages,
   first storing means for storing a time by a clock with the subscriber identity based on a message between the terminal equipment and the network and relating to a first area,
   second storing means for storing a time by a clock with the subscriber identity based on a message between the network and the same terminal equipment and relating to a second area,
   means for selecting the times which relate to the same subscriber identity,
   calculating means for calculating a time difference between the selected times
   means to obtain the distance between the first area and the second area,
   means using said time difference and said distance for producing traffic data about a certain vehicle moving said terminal equipment,
   means for collecting the calculated time differences to form a statistic distribution, and
   calculating means for calculating a characteristic magnitude for the statistic distribution.

16. System according to claim 15, characterized in that the areas are boundary areas in between the location areas of the mobile station network.

17. System according to claim 16, characterized in that the areas are boundary areas in between the routing areas of a packet radio system.

18. System according to claim 16, characterized in that the messages between the terminal equipment and the network are location update requests and/or location update complete messages.

19. System according to claim 15, characterized in that the means utilizing the stored times by the clock includes paging means to page for the time by the clock based on the stored subscriber identity.

20. System according to claim 19, characterized in that the system includes detecting means for detecting a changed subscriber identity and storing means for storing the detected changed subscriber identity.

21. System according to claim 15, characterized in that the system includes
   calculating means to calculate the average speed of the traffic flow with the aid of the measurement and the characteristic magnitude.

22. System according to claim 15, characterized in that the system includes
   calculating means to calculate a second characteristic magnitude for the statistic distribution, and calculating means for calculating an error estimate for the traffic flow's speed with the aid of the measurement and the second magnitude.

23. System according to claim 15, characterized in that the system includes location information of the determined areas in order to obtain traffic data.

24. System according to claim 15, characterized in that the system further includes
means for choosing a place on at least one road in each of the area, and storing means for storing the said place on the road in the traffic data collection system.

25. System according to claim 24, characterized in that the means for use in area determination is adapted to track the location areas or to analyze the signaling and to use satellite radio determination.

26. System according to claim 24, characterized in that the means for use in area determination is adapted to utilize in a calculatory manner the measurement results obtained from the signaling information of the mobile station network.

27. System according to claim 24, characterized in that the means used for choosing of the place on the road corresponds to a vehicle's recorder of the covered distance.

28. System according to claim 24, characterized in that the means used for choosing of the place on the road is adapted to use a digital map base.

* * * * *